March 18, 1952

H. A. BOWMAN 2,589,922

QUICK DETACHABLE ANCHORING MEANS
FOR CHAIRS AND THE LIKE

Filed March 1, 1949

Inventor

Harry A. Bowman

By *Clarence A. O'Brien
and Harvey B. Jacobson*
Attorneys

March 18, 1952     H. A. BOWMAN     2,589,922
QUICK DETACHABLE ANCHORING MEANS
FOR CHAIRS AND THE LIKE Filed March 1, 1949     2 SHEETS—SHEET 2

Inventor
Harry A. Bowman

By *Clarence A. O'Brien
and Harvey B. Jacobson*
Attorneys

Patented Mar. 18, 1952

2,589,922

UNITED STATES PATENT OFFICE 2,589,922

QUICK DETACHABLE ANCHORING MEANS FOR CHAIRS AND THE LIKE

Harry A. Bowman, Anchorage, Territory of Alaska

Application March 1, 1949, Serial No. 79,037

4 Claims. (Cl. 287—20)

1

The present invention relates to new and useful improvements in quick detachable anchoring means and more particularly to means for anchoring the legs of a seat, chair, cargo or other object to the floor of an airplane, bus or other vehicle.

An important object of the invention is to provide a locking device for easily and quickly securing an object to a floor and for subsequently removing the same without the use of tools.

A further object of the invention is to provide a chair or cargo anchoring device for use with a rail secured to the floor of an airplane or vehicle and embodying means for securing the anchoring device in a longitudinally adjusted position on the rail.

Another object is to provide a device of this character of simple and practical construction, which is efficient and reliable in operation, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
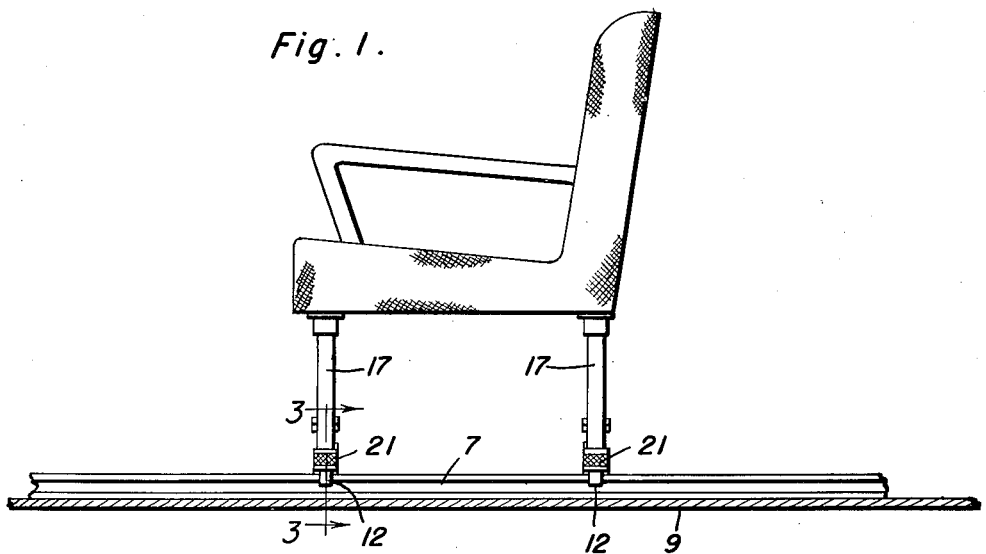
Figure 1 is a side elevational view showing the anchoring device used for securing a chair to a floor.
Figure 2:
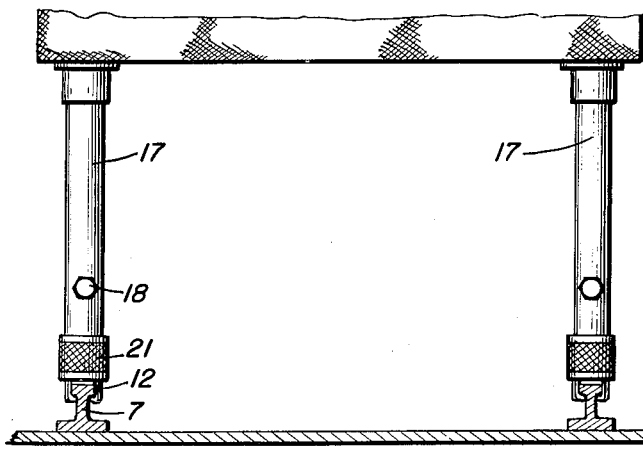
Figure 2 is an enlarged fragmentary front elevational view.
Figure 9:
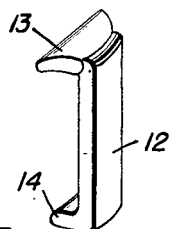
Figure 9 is a similar view of one of the jaws.
Figure 10:
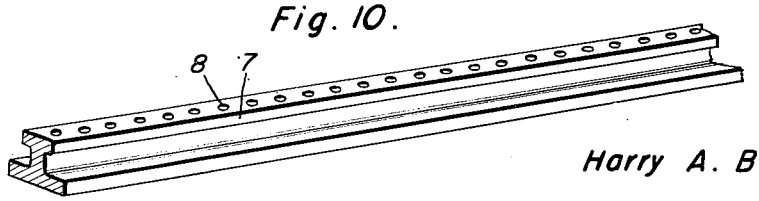
Figure 10 is a fragmentary perspective view of one of the rails to which the anchoring device is secured.
Figure 3:
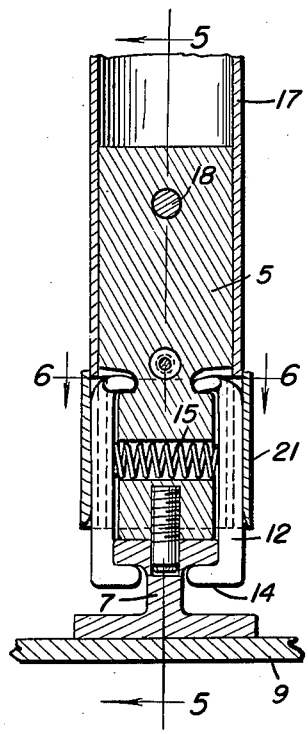
Figure 3 is an enlarged fragmentary vertical sectional view taken on a line 3—3 of Figure 1.

Referring now to the drawings in detail wherein for the purpose of illustration I have disclosed a preferred embodiment of the invention, the numeral 5 designates a relatively short anchoring post of suitable bar stock having an anchor-

2 ing pin 6 extending downwardly from the central portion of its lower end and preferably connected to the post by threaded engagement therewith.

The lower end of post 5 rests on the top of a T-shaped rail 7 with the anchoring pin 6 selectively engaged in openings 8 at longitudinally spaced intervals in the top of the rail. The rail 7 is suitably secured to a floor 9 of an airplane, bus or other vehicle.

A pair of horizontal grooves 10 are formed at diametrically opposite sides of post 5 and the surface of the post below each groove is flattened as shown at 11. A jaw 12 preferably of strap metal is positioned vertically against each flat side 11 of the post and is formed at its upper end with a laterally projecting flange 13 engaged in groove 10, the outer edge of the flange preferably being rounded to permit rocking movement thereof in the groove.

The lower end of jaw 12 is also formed with a laterally projecting flange 14 positioned under flange 13 and projects downwardly below the lower end of post 5 for engagement under the flanges at the opposite sides of rail 7.

Figure 4:
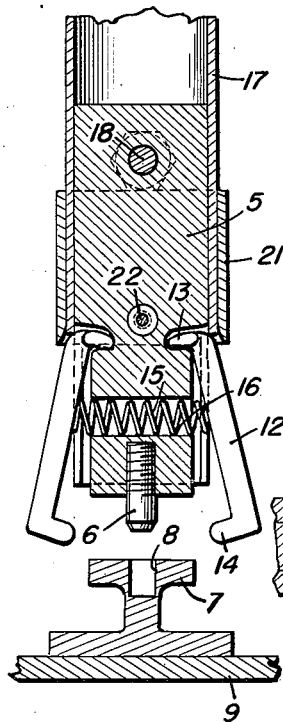
Figure 4 is a similar view showing the jaws of the locking device released.
Figure 5:
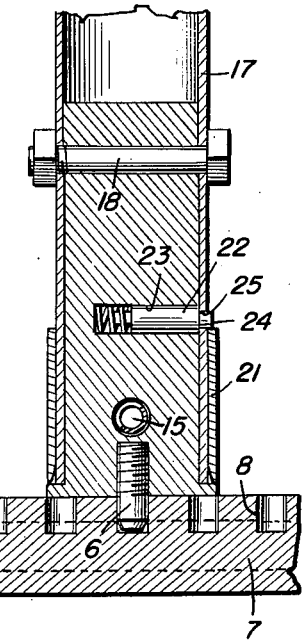
Figure 5 is a vertical sectional view taken on a line 5—5 of Figure 3.
Figure 7:
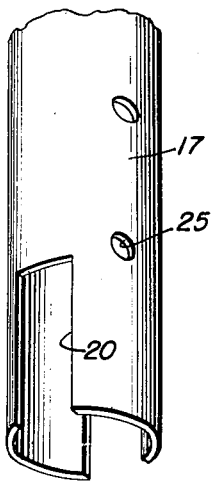
Figure 7 is a fragmentary perspective view of the lower end of one of the chair legs.

A coil spring 15 is positioned in a transverse opening 16 in the lower end of post 5 with the ends of the spring bearing against the inner faces of the pair of jaws 12 to move the jaws in an open position for releasing the flange rail 7 as shown in Figure 4 of the drawings.

The post 5 is secured in the lower end of a tubular chair leg 17, or other article to be anchored to rail 7, each leg of the chair being provided with one of the anchoring posts and a pair of the rails being provided for the legs at each side of the chair.

The post 5 is secured in the leg by means of a bolt and nut 18 and the lower edge of the leg rests on flanges 19 at the lower end of the post. Notches or slots 20 are formed in diametrically opposite sides of the lower end of the leg to permit opening movement of jaws 12.

The jaws 12 are locked in their closed position by a locking sleeve 21 slidably mounted on the leg for movement downwardly over the jaws, the sleeve being held in its locking position by a spring projected pin 22 recessed in an opening 23 in the post 5 and with a button 24 of reduced diameter at the outer end of the pin working in an opening 25 in the leg and projecting outwardly to engage the upper edge of sleeve 21. The lower edge of sleeve 21 engages flanges 19 to prevent loss of the sleeve.

Figure 6:
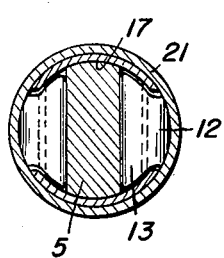
Figure 6 is a transverse sectional view taken on a line 6—6 of Figure 3.
Figure 8:
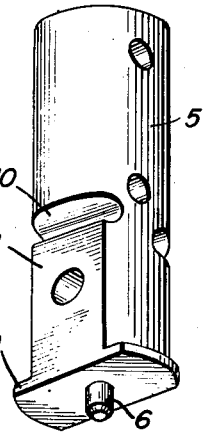
Figure 8 is a perspective view of the anchoring post.

As shown more clearly in Figure 6 the upper flanges 13 of the jaws are flared to extend behind leg 17 to prevent separation of the jaws from the post.

The device may be used as an anchoring means for the legs 17 of a chair, seat or the like by providing a pair of the rails 7 for each pair of legs and moving or adjusting the legs along the rails to a desired position and then placing the pins 6 in selected openings 8 of the rails and sliding locking sleeve 21 downwardly to swing jaws 12 inwardly against post 5 and with the lower flanges 14 of the jaws engaged under the head of the rail.

The pin 22 locks the sleeve 21 from accidental unlocking or raising movement.

The device may also be used as a cargo anchor in airplanes or vehicles by utilizing a tubular stake (not shown) for attaching to post 5 similar to leg 17 or attaching a rope or the like directly to the post.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An anchoring device comprising a rail having a T head, an anchoring post resting on the top of the rail, and movable longitudinally thereof, a pair of jaws pivotally carried by the post in longitudinally extending position and swingable into and out of gripping relation to the edges of the rail, a tubular member in which said post is secured and having longitudinal slots out of which said jaws may swing out of gripping relation, and a locking sleeve on said member slidable over said slots to lock said jaws in gripping relation.

2. An anchoring device comprising a rail having a T head, an anchoring post resting on the top of the rail, and movable longitudinally thereof, a pair of jaws pivotally carried by the post in longitudinally extending position and swingable into and out of gripping relation to the edges of the rail, a tubular member in which said post is secured and having longitudinal slots out of which said jaws may swing out of gripping relation, and an element slidable on said tubular member over said slots to lock said jaws in gripping relation, said post having stop means thereon for limiting such sliding of said element.

3. An anchoring device comprising a rail having a T head and longitudinally spaced apart recesses in the top of the rail, an anchoring post resting on top of the rail, a reduced axial pin on the lower end of the post selectively engaged in said recesses to hold the post in longitudinally adjusted position on the rail, and clamping means carried by the post for engaging the edges of the rail to hold the post in an upright position.

4. An anchoring device comprising a rail having a T head and longitudinally spaced apart recesses in the top of the rail, an anchoring post resting on top of the rail, a reduced axial pin projecting downwardly from the bottom of the post and selectively engaged in said recesses to hold the post in longitudinally adjusted position on the rail, clamping means carried by the post for engaging the edges of the rail to hold the post in an upright position, a tubular member in which said post is secured, and means slidable on said member to lock said clamping means in clamping engagement with said edges.

HARRY A. BOWMAN.

REFERENCES CITED

The following references are of record in the file of this patent:

UNITED STATES PATENTS

| Number | Name | Date |
| --- | --- | --- |
| 1,603,393 | Malcolm | Oct. 19, 1926 |
| 1,778,332 | Meyer | Oct. 14, 1930 |
| 1,816,694 | Pope | July 28, 1931 |
| 1,931,289 | Hambrook et al. | Oct. 17, 1933 |
| 2,408,547 | Bertschinger | Oct. 1, 1946 |
| 2,448,817 | McArthur | Sept. 7, 1948 |